June 16, 1942. H. Y. STEBBINS 2,286,514
APPARATUS AND METHOD FOR COOLING FOODS AND THE LIKE
Filed June 6, 1938 2 Sheets-Sheet 1
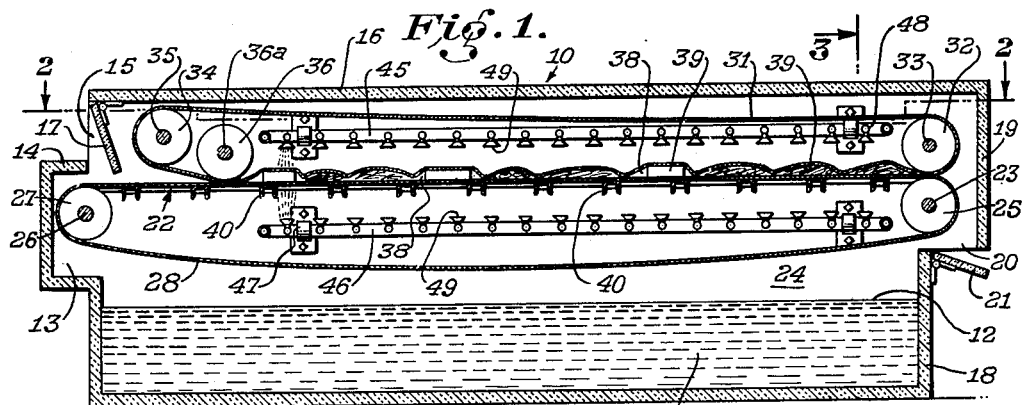
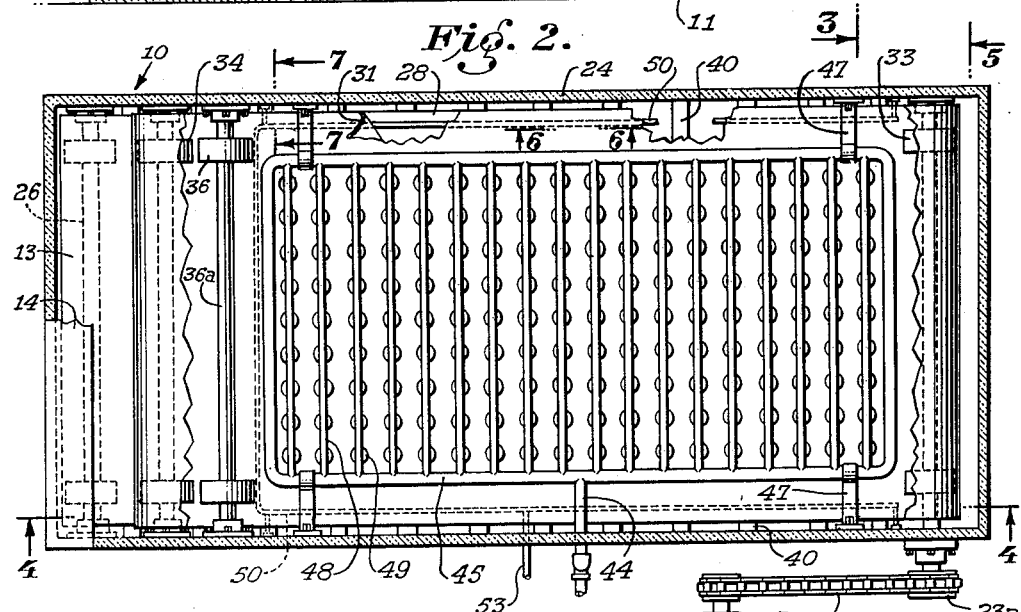
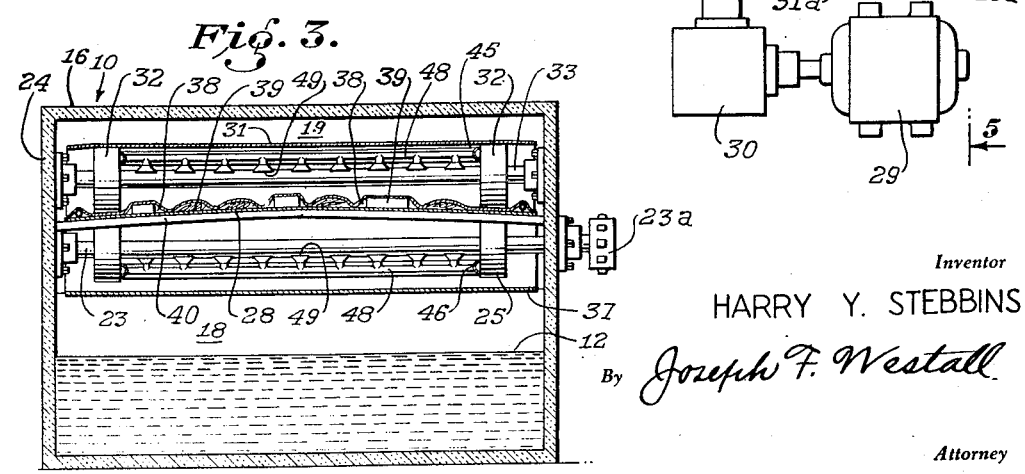
Inventor
HARRY Y. STEBBINS
By Joseph F. Westall
Attorney

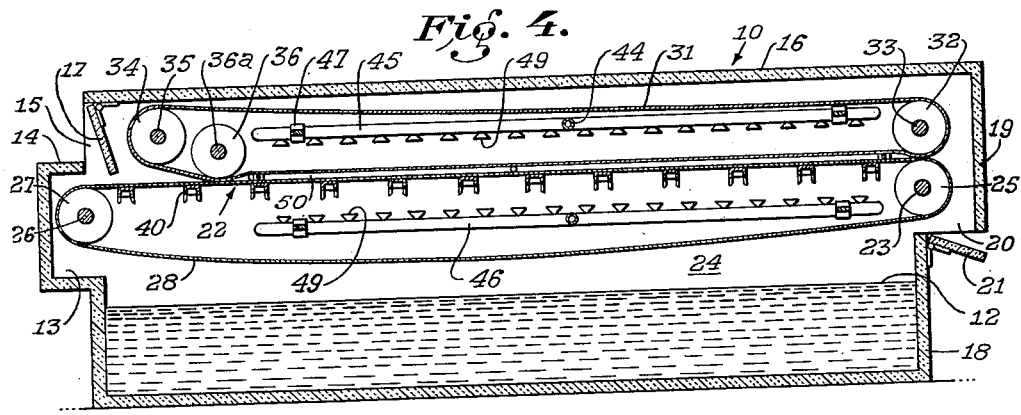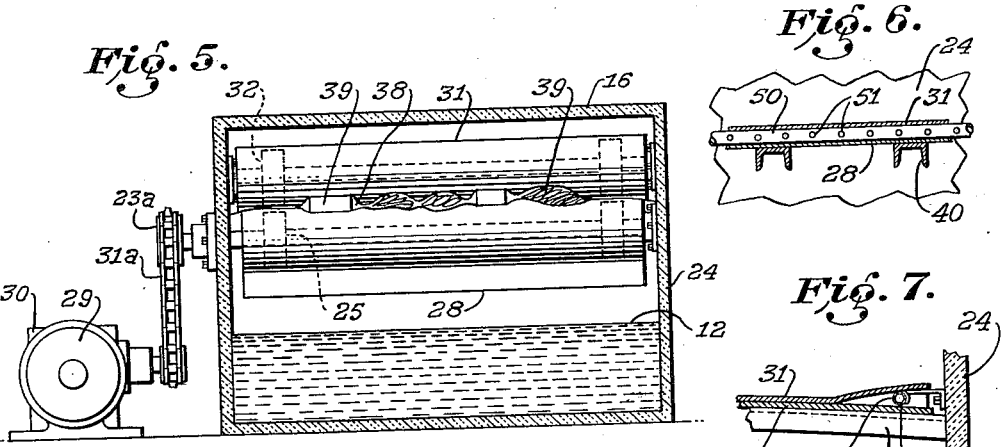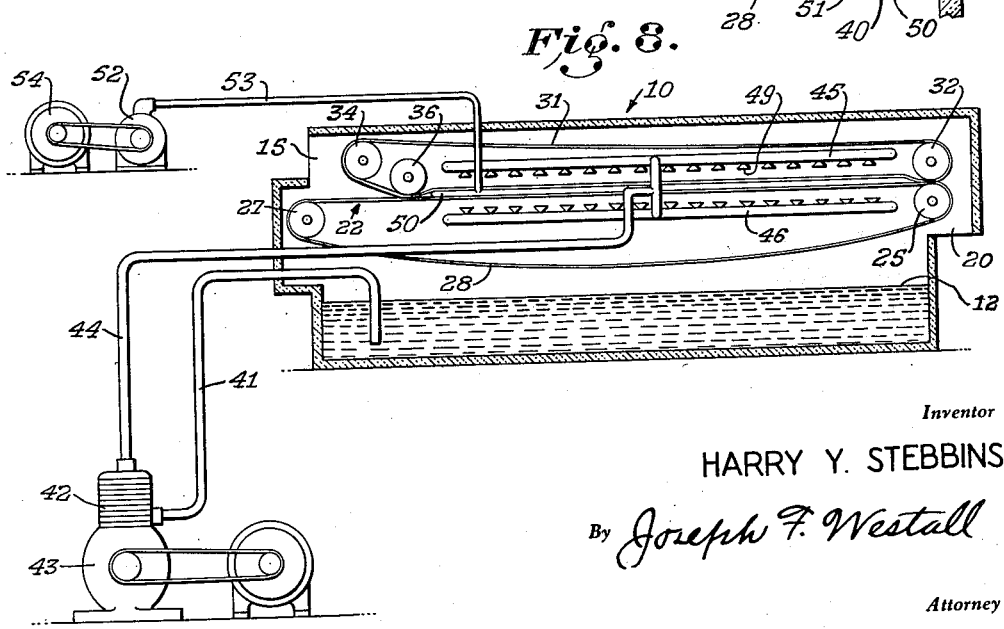

Patented June 16, 1942

2,286,514

UNITED STATES PATENT OFFICE 2,286,514

APPARATUS AND METHOD FOR COOLING FOODS AND THE LIKE

Harry Y. Stebbins, Los Angeles, Calif.

Application June 6, 1938, Serial No. 211,996

17 Claims. (Cl. 62—104)

This invention relates to apparatus and methods for cooling foods and the like, and contemplates generally a cabinet inclosing a belt conveyor to carry products to be cooled from a normally closed inlet opening in one side of the cabinet to an outlet adjacent the opposite end of the conveyor, refrigerated brine being applied to the food products throughout their travel through the cabinet to cause their refrigeration.

In the art prior to my invention, it is common to refrigerate food products by spraying a refrigerant directly on the food. In such processes, it is essential that the refrigerant be carefully prepared to prevent the same from affecting the flavor of the food. To avoid this disadvantage, apparatus has been developed in which the products to be frozen are shielded from direct contact with the refrigerant as, for example, by enclosing the food to be cooled in bags and lowering the bags into the brine, or in accordance with other well known methods, the food is placed between mono-metal plates movable relative to each other so as to permit their adjustment for contact with food products of particular uniform size, the refrigerant being sprayed against the plates. In the latter apparatus, the temperature of the brine must be much lower than in a process relying upon direct contact of the refrigerant and food to be cooled, due to the insulation of the food afforded by the plates. The advantages of the conveyor system of continuous movement of the food through the cabinet, e. g., the maintenance of minimum temperature while placing in and removing food from the cabinet, are not available in such apparatus as a consequence of the utilization of rigid supporting and shielding members for the food products.

It is a general object of this invention to obviate the disadvantages above-mentioned by the provision of an insulated cabinet adapted for continuous operation, whereby food may be introduced into, refrigerated, and removed from the cabinet while maintaining a minimum temperature therein, in combination with means associated with the conveyor system to protect the food products from brine or other refrigerant used, without deflecting or absorbing the cold, thereby permitting the use of a comparatively high temperature refrigerant.

Another and highly important object is to provide a protective continuous covering for the products carried by the conveyor composed of a flexible material adapted to conform substantially to the shape of products of different sizes, to obviate the formation of insulating air chambers otherwise occurring between the sides of or depressed surfaces in the products and the covering.

Another object is the provision of a pair of endless belts having adjacently moving reaches between which the product is carried, said belts having normally contacting portions at their sides and ends to form a substantially closed refrigeration chamber.

Still another object is to provide means for drawing the conveyor belt and the overlying food covering together at their edges and also to insure a minimum air space between the belts around the products comprising apparatus for drawing air from the area between the contacting reaches of the conveyor and food covering.

Other objects and salient features of my invention, such, for example, as efficiency of operation, quick refrigeration, conservation of time by permitting continuous introduction and withdrawal of food, minimum oxidation of the product while being treated due to removal of air from the refrigeration zone, more thorough and uniform cooling of each particle of the foods treated, and economy of construction, will be apparent to those of skill in the art to which my invention appertains, from an examination of the following description read in the light of the accompanying drawings, in which:

Fig. 1 is a sectional view of the cabinet depicting the conveyor assembly and spray system;

Fig. 2 is a section taken on line 2—2 of Fig. 1;

Fig. 3 is a sectional view on lines 3—3 of Fig. 1;

Figs. 4, 5, 6 and 7 are sections taken on correspondingly numbered lines of Fig. 2;

Fig. 8 is a diagrammatic view of brine distributing system and the apparatus for effecting the evacuation of air from the refrigeration chamber between the belts.

Referring to the drawings in detail, the numerals of which indicate similar parts throughout the several views, 10 designates generally an insulated cabinet inclosing the apparatus of my invention. The lower portion of the cabinet forms a sump 11 into which brine or other refrigerant 12 drains from the refrigeration unit. One end of the cabinet overhangs the end of the sump to form a recess 13 within the cabinet extending the width thereof for a purpose later referred to. The top 14 of the overhang provides a shelf adjacent an inlet opening 15 in the cabinet formed between the shelf and the top 16 of the cabinet. A gravity or spring-actuated trap door 17 hinged to the top of the cabinet, normally maintains the inlet 15 closed.

The opposite end of the upper portion of the cabinet extends beyond the adjacent end wall 18 of the sump 11, being closed by a wall 19. The exit opening 20 of the cabinet through which frozen food products are removed, as will appear, is formed between the upper edge of wall 18 and the lower edge of wall 19. A trap door 21 hinged to wall 18 normally closes the exit 20.

An endless belt conveyor 22 is contained within the cabinet extending from adjacent the inlet opening 15 to a point over the outlet opening 20. For this purpose, a drive shaft 23 is journalled in the sides 24 of the cabinet over the trap door 21, having mounted thereon adjacent its opposite ends drive sheaves 25. Within the recess 13 at the opposite end of the cabinet, the ends of a shaft 26 are journalled in the sides of the cabinet. Follower sheaves 27 are secured to shaft 26 in alignment with drive sheaves 25, respectively. An endless belt 28 composed of Pliofilm or other thin waterproof material, is carried by the drive and follower sheaves 27 just described.

The belt 28 is of a width greater than the distance between the outer edges of the sheaves on each shaft, its side edges tending to droop downwardly to facilitate drainage of refrigerant therefrom as hereinafter described. The conveyor belt 28 is driven by means of motor 29 (Fig. 2) through a speed reducer 30 of conventional construction, and chain 31a which engages a gear 23a secured to the end of the drive shaft 23 protruding through the wall of the cabinet.

A second endless belt 31 composed of Pliofilm or other thin flexible or waterproof material is carried above belt 28 so as to be normally in contiguous relation therewith, by means of a pair of sheaves 32 mounted on and adjacent the ends of a shaft 33 journalled in the walls of the cabinet above and in vertical alignment with shaft 23. Shafts 23 and 33 are spaced apart a distance substantially equal to the diameters of one each of sheaves 25 and 32, whereby the upper sheaves 32 will be driven by contact with the lower motor driven sheaves 25. The opposite end of the upper belt is carried by follower sheaves 34 mounted on the ends of a shaft 35 and is journalled in the side walls of the cabinet adjacent trap door 17.

The upper belt 31 of Pliofilm serves as a protective covering for food carried through the cabinet by the conveyor belt 28. A pair of guide rollers 36 are journalled on a shaft 36a carried in the sides of the cabinet between the opposite reaches of the upper belt adjacent the sheaves 34 and, bearing against the lower reach of the upper belt, urge the same against the upper surface of the conveyor belt. The protective covering 31 is of a width substantially the same as, or slightly greater than, belt 28 so as to form a lap 37 at each side thereof. The adjacent surfaces of the respective laps 37 and the side edges of the conveyor belt tend to gravitate together, which, in combination with the closure of the space between the adjacent reaches of the respective belts by the rollers 36, and the contact of belts 28 and 31 effected by the drive sheaves, forms a closed refrigerating chamber 38 between the normally contiguous surfaces of the two belts through which food 39 placed on the conveyor adjacent the inlet opening is carried. The adjacent reaches of the conveyor and drive belts 28 and 31 are curved downwardly toward the sides thereof being so supported by a plurality of curved channel irons 40 secured to opposite side walls of the cabinet and extending under the upper reach of the lower belt 28.

To apply refrigerant to the adjacent reaches of the protective covering and conveyor, a pipe 41 (Fig. 8) leads from the sump 11 to a refrigeration unit of any conventional type, diagrammatically illustrated at 42 (Fig. 3). A motor driven pump 43 is provided which is adapted to draw the refrigerated fluid through pipe 41 from the sump 11 through the refrigerating unit and, after its refrigeration, convey it through a conduit 44 into the cabinet. Conduit 44 is connected to an upper and a lower rectangular header, 45 and 46, respectively, supported between the opposite reaches of the belts 28 and 31 by hangers 47 secured to the side walls 24 of the cabinet. A plurality of branch pipes 48 (Fig. 2) from each head, in spaced relation with respect to each other, extend below the upper reach of the lower belt and over the lower reach of the upper belt. Each branch pipe 48 is provided with a series of nozzles 49 which are directed toward the respective contacting reaches of the two belts.

The operation of my invention is briefly described as follows: Food of different or the same sizes, in containers or otherwise, is placed on the conveyor belt 28 through the trap door 17. The conveyor carries the food between the belts to enter the refrigerating chamber 38. The refrigerated brine, pumped through header 46, is discharged with sufficient force through nozzles 49 against the upper surface of the lower reach of the loose belt 31 to cause it to closely conform to the shape of the individual food products. Similarly the force of the brine ejection against the lower belt tends to urge the belt to conform to the shape of the bottom of the product. The brine thus ejected against all sides of the food products absorbs heat therefrom through the thin belt 31, causing refrigeration of the food in a well known manner. The food will pass from between the belts 28 and 31 adjacent end wall 19 (as shown in Fig. 5) and drop through the trap door 21.

To facilitate conformance of the upper belt to the shape of the product to be cooled, a partial vacuum may be produced, in specific embodiments, between the contacting surfaces of the belt, i. e., refrigerating chamber 38, around the food. For this purpose, a pipe 50 (Figs. 3 and 7) is provided within and along each side of the cabinet between the overhanging sides of the lower belt and the respectively overlying laps of the lower reach of the upper belt. A series of openings 51 (Fig. 6) are formed along the length of each pipe 50 through which air is drawn from the refrigeration chamber between the belts by means of a vacuum pump 52 (Fig. 8) connected to the pipes by a conduit 53. The pump may be operated by any suitable actuating means 54.

It will be observed that I have provided a novel cooling unit embodying a conveyor system in an insulated cabinet wherein each particle of food refrigerated is temporarily closely encased in a thin flexible protective covering made to conform to the shape of the food by pressure on the outside and a vacuum in the inside of the refrigerating chamber whereby refrigerated brine, discharged thereagainst, may be most effectively utilized to reduce the temperature of the food.

While I have described but one embodiment of my invention, it will be understood that numerous changes may be made in size, shape, number and proportion of the various parts, that the belts may be S-shaped to reduce the length of the cabinet, and that only a single set of nozzles may be employed to discharge against only one belt if desired, all without departing from the spirit of my invention as defined by the appended claims.

It is to be understood that the term "food products" as employed in the following claims, is not to be regarded as restricting the use of my invention, as it will be obvious that substances other than those used for food may be cooled in precisely the same manner as hereinabove described.

What I claim and desire to secure by Letters Patent is:

1. The method of cooling products comprising the steps of: placing the products on a thin sheet of material, covering the products with a second flexible sheet, spraying a refrigerant against each of said sheets, and drawing fluid from between said sheets.

2. In a device of the character described, a cabinet, an upper and a lower flexible belt in said cabinet movable with the side edges thereof in contiguous relation with respect to each other to form a refrigerating chamber therebetween, said cabinet having an inlet and an outlet opening adjacent opposite ends of said belts, means for drawing fluid from said refrigerating chamber, and means for applying a liquid refrigerant to said belts.

3. In a device of the character described, a cabinet, an upper and a lower flexible belt in said cabinet movable with the side edges thereof in contiguous relation with respect to each other to form a refrigerating chamber therebetween, said cabinet having an inlet and an outlet opening adjacent opposite ends of said belts, means for drawing fluid from said refrigerating chamber, and means for applying a liquid refrigerant to the upper belt.

4. In a device of the character described, a cabinet, an upper and a lower flexible belt in said cabinet movable with the side edges thereof in contiguous relation with respect to each other to form a refrigerating chamber therebetween, said cabinet having an inlet and an outlet opening adjacent opposite ends of said belts, means for drawing fluid from said refrigerating chamber, and means for applying a refrigerant to the lower belt.

5. In a device of the character described, a cabinet, a conveyor belt movable in said cabinet, a flexible belt movable above said conveyor belt, said cabinet having an inlet and outlet opening adjacent opposite ends of said belt, means to draw fluid from between said belts, and means to apply a refrigerant to said conveyor belt.

6. In a device of the character described, a sheet for the support of products to be refrigerated, a separate flexible covering for said products superimposed on said belt, said sheet and covering coacting to encase the products, and fluid spray means to urge said covering to closely conform to the shape of the products.

7. In a device for cooling, a supporting surface for matter to be cooled, a flexible sheet overlying said surface to cover said matter, means to draw said sheet closely around said matter to be cooled on said surface, and means forming a closed chamber to enclose said surface and sheet.

8. In a device for cooling, a conveyor belt to carry matter to be cooled, a flexible sheet overlying said belt, and fluid means to urge said sheet closely around matter to be cooled on said belt.

9. In a device for cooling a product, a conveyor belt for the support of a product to be cooled, means to move said conveyor belt, a pair of sheaves, means to rotatably support said sheaves, and an endless sheet carried by said sheaves and having a reach thereof superimposed on said belt actuated to move with said belt by frictional contact therewith.

10. In a device for cooling a product, a cabinet, flexible casing means comprising a pair of separate sheets movable through the cabinet and completely enclosing a product to be cooled, and means to apply refrigerant to said last-named means in said cabinet to compel said flexible casing to closely conform to the shape of the product.

11. In a device for cooling products, a cabinet, a pair of wheels in said cabinet, a conveyor belt carried by said wheels and moved by rotation of said wheels to carry a plurality of products separately deposited on said belt through said cabinet, and a sheet to cover said products on said belt, said sheet having a reach thereof in contact with said belt at opposite sides of the products covered by the sheet.

12. In a device for cooling products, a cabinet, a conveyor belt entirely within said cabinet, means to drive said conveyor to carry a product through said cabinet, a sheet having a reach thereof adapted to lie normally in contact with said belt, and supporting means to support a portion of said sheet adjacent said reach spaced above said belt, said belt being driven by said first-named means to carry products to be refrigerated under said supporting means and thence under said reach of said sheet.

13. In a device for cooling products, a conveyor belt for the successive placement thereon and support thereby of separate products to be cooled, a single flexible sheet for covering said separate products on said belt adapted to conform to the shape of the upper surface of each of the products, the edges of said belt and sheet being contiguous to form a substantially closed chamber.

14. In a device for cooling a product, a cabinet having openings at opposite ends thereof, doors normally closing said openings, respectively, a conveyor within said cabinet movable adjacent both of said openings to carry a product to be cooled from adjacent one of said openings to adjacent the other of said openings, a sheet supported in the cabinet above said conveyor to normally contact said conveyor, said conveyor being adapted to carry products deposited thereon under said sheet, and means to refrigerate the product within said cabinet between the conveyor and sheet.

15. The method of cooling products comprising the steps of; placing the products on a thin sheet of material, covering the products with a second flexible sheet, spraying a refrigerant against one of said sheets and drawing fluid from between said sheets.

16. In a device for cooling a product, a cabinet, a flexible casing for completely enclosing a product to be cooled, means for moving said casing through said cabinet, means to open and close said casing at opposite sides of the cabinet, and means to apply a refrigerant directly to said casing in said cabinet to urge the casing into close contact with the product.

17. In a device for cooling a product, a refrigerating compartment, a flexible sheet having a supporting surface for a product to be cooled, means to move said sheet through said compartment, and a supporting member in said compartment under said sheet to support the latter and maintain the supporting surface convex.

HARRY Y. STEBBINS.